United States Patent [19]

Ament et al.

[11] Patent Number: 5,238,096
[45] Date of Patent: Aug. 24, 1993

[54] CLUTCH PLATE FOR A MOTOR VEHICLE FRICTION CLUTCH

[75] Inventors: Norbert Ament, Werneck; Harald Raab, Schweinfurt, both of Fed. Rep. of Germany

[73] Assignee: Fichtel & Sachs A.G., Schweinfurt, Fed. Rep. of Germany

[21] Appl. No.: 927,686

[22] Filed: Aug. 6, 1992

[30] Foreign Application Priority Data

Aug. 6, 1991 [DE] Fed. Rep. of Germany ....... 4125966

[51] Int. Cl.$^5$ .................. F16D 13/68; F16D 3/14; F16D 3/66
[52] U.S. Cl. .................. 192/106.2; 464/63; 464/68
[58] Field of Search .................. 192/106.2; 464/63, 68

[56] References Cited

U.S. PATENT DOCUMENTS

| 4,700,821 | 10/1987 | Maucher et al. | 192/106.2 |
| 4,883,156 | 11/1989 | Rohrle et al. | 192/106.2 |
| 4,890,712 | 1/1990 | Maucher et al. | 192/106.2 |
| 4,998,608 | 3/1991 | Raab et al. | 192/106.2 |

FOREIGN PATENT DOCUMENTS

| 3922730 | 1/1991 | Fed. Rep. of Germany . | |
| 2169988 | 7/1986 | United Kingdom | 464/68 |
| 2233735 | 1/1991 | United Kingdom . | |

OTHER PUBLICATIONS

Search Report GB 2233735 A (Fichtel & Sachs).

Primary Examiner—Rodney H. Bonck
Attorney, Agent, or Firm—Anderson Kill Olick & Oshinsky

[57] ABSTRACT

The invention relates to a clutch plate with a torsional vibration damper in which there is provided an entrained friction arrangement which acts before the transition from idling spring action into load spring action. During a reversal of the direction of rotation, the entrained friction arrangement is carried by frictional force and it runs through its free angle only during the transition from the load spring arrangement into the idling spring arrangement.

13 Claims, 2 Drawing Sheets

CLUTCH PLATE FOR A MOTOR VEHICLE FRICTION CLUTCH

BACKGROUND OF THE INVENTION

The invention relates to a clutch plate for a motor vehicle friction clutch, and in particular a clutch plate with a torsional vibration damper which comprises a friction arrangement with entrained friction.

A clutch plate for a motor vehicle friction clutch is known from DE-A-3 922 730 (U.S. Pat. No. 4,998,608), of which the torsional vibration damper comprises a spring arrangement designed for idle running in addition to a load spring arrangement designed for load running. The load spring arrangement comprises two lateral discs which are connected to form a unit, are rotatably mounted on a hub of the clutch plate and between which there is arranged a hub disc coupled torsionally elastically via several springs to the lateral discs. The hub disc is connected to the hub non-rotatably but with rotational play via teeth. The rotational play of the teeth determines the operating range of the idling spring arrangement mounted between the hub disc and one of the two lateral discs.

The spring arrangements are allocated a plurality of friction arrangements which are provided in the space radially between the hub and the region of the springs of the load spring arrangement. An idling friction arrangement arranged in the region of the teeth allows basic friction during idle running. Friction means of a load friction arrangement which is effective during load running is provided radially above the teeth on either side of the hub disc. The friction means of the load friction arrangement are fixed between the two lateral discs by an axially acting spring, the force trend of this spring closing via an input part of the idling spring arrangement toward the hub disc of the load spring arrangement. A so-called entrained friction arrangement radially overlaps the input part of the idling spring arrangement, this friction arrangement being arranged axially between the input part and the adjacent lateral disc and comprising, at this point, a friction ring resting on the lateral disc, a control disc and an axially acting spring for generating the frictional force. The control disc is coupled via axially acting tabs to an output part of the idling spring arrangement resting non-rotatably on the hub. The tabs of the control disc engage in recesses in the output part with play in the peripheral direction which is smaller than the rotational play determined by the teeth of the hub disc and defining the operating range of the idling spring arrangement. In the known clutch plate, the friction ring of the entrained friction arrangement rests in an outwardly curved bulge of the lateral disc. The bulge widens the external contour of the torsional vibration damper in an axial direction in an undesirable manner.

SUMMARY OF THE INVENTION

It is a main object of the invention to improve a clutch plate of the type described at the outset such that the axial space required for the torsional vibration damper of the clutch plate is reduced.

The invention is based on a clutch plate for a motor vehicle friction clutch which comprises the following features:

a hub which defines an axis of rotation, a load spring arrangement designed for load running with two lateral discs which are axially spaced from one another, are rigidly connected to one another and are rotatable relative to the hub round the axis of rotation, a hub disc which is arranged axially between the lateral discs and is coupled via teeth with a first predetermined rotational play but otherwise non-rotatably to the hub and a plurality of load springs which torsionally elastically couple the lateral discs to the hub disc, an idling spring arrangement which is arranged axially between a first of the two lateral discs and the hub disc and is designed for idle running, with an input part non-rotatably connected to the hub disc, an output part non-rotatably connected to the hub and at least one idling spring which couples the input part torsionally elastically to the output part, wherein the input part is supported on the first lateral disc and carries axial projections which support the input part axially also on the hub disc and connect it without rotational play non-rotatably to the hub disc, an idling friction arrangement which is effective at least during idle running, with first friction means pretensioned by a first spring, a load friction arrangement which is effective during load running, with second friction means by means of which the input part of the idling spring arrangement is supported on the first lateral disc, and with an axially acting second spring which is arranged together with third friction means axially between a second of the two lateral discs and the hub disc radially between the hub and the region of the load springs and axially pretensions the second friction means and third friction means, an entrained friction arrangement with a control disc which is rotatable relative to the hub disc and the lateral discs and is coupled via tabs projecting axially from its outer periphery with a second predetermined rotational play smaller than the first predetermined rotational play but otherwise non-rotatably to the output part of the idling spring arrangement and is supported via fourth friction means on one of the lateral discs and with an axially acting third spring axially pretensioning the fourth friction means, and clutch friction linings held on one of the lateral discs.

With a clutch plate of this type it is proposed according to the invention that the control disc is supported via the fourth friction means on the second lateral disc and via fifth friction means on the hub disc, wherein the tabs of the control disc extend through openings in the hub disc to the output part and that the fourth friction means and fifth friction means are arranged together with the axially acting third spring radially between the third friction means and the axially acting second spring on the one hand and the region of the load springs on the other hand. As the components of the entrained friction arrangement are provided on the side of the hub disc remote from the idling spring arrangement, radially outside the components of the load friction arrangement arranged there, the two lateral discs may be plane in design in the region radially inside the springs of the load spring arrangement and this makes the best possible use of the available space.

According to a second aspect of the invention which may also be adopted with a clutch plate which is different from the above-described clutch plate, for example with the clutch plate known from DE 39 22 730, it is proposed that the clutch plate be supported via fifth friction means on the hub disc or a component non-rotatably connected to the hub disc and that the fifth friction means generate a greater moment of friction than the fourth friction means. Since the moment of friction acting between the control disc and the hub disc is greater than the moment of friction between the control disc and the adjacent lateral disc, it is ensured in a simple manner that the entrained friction arrangement is invariably effective only within the region of the idling spring arrangement, in particular also during a reversal of the direction of rotation in the working range of the load spring arrangement. The entrained friction arrangement will invariably be employed in equal rotational angle ranges, for example during load change reactions during which the torsional vibration damper processes rotational angle ranges which are considerably greater than the range of action of the idling spring arrangement.

According to both aspects of the invention, a friction ring, preferably consisting of organic material, is expediently inserted between the control disc, preferably designed as a sheet metal shaped part, and the hub disc. Such a friction ring allows relatively high moments of friction. It is also expedient if a thrust collar as well as an axially acting spring is arranged between the control disc and the lateral disc adjacent to it, the thrust collar being non-rotatably and at the same time radially fixed relative to the lateral disc by noses. The thrust collar preferably consists of plastics material which leads to comparatively low moments of friction between the thrust collar and the control disc. The higher moment of friction of the control disc relative to the hub disc ensures that the entrained friction arrangement is invariably employed only within the angle of rotation of the idling spring arrangement.

The various features of novelty which characterize the invention are pointed out with particularity in the claims annexed to, and forming part of, this disclosure. For a better understanding of the invention, its operating advantages and specific objects attained by its use, reference should be had to the accompanying drawings and descriptive matter in which there are illustrated and described preferred embodiments of the invention.

DESCRIPTION OF PREFERRED EMBODIMENTS

Figure 1:
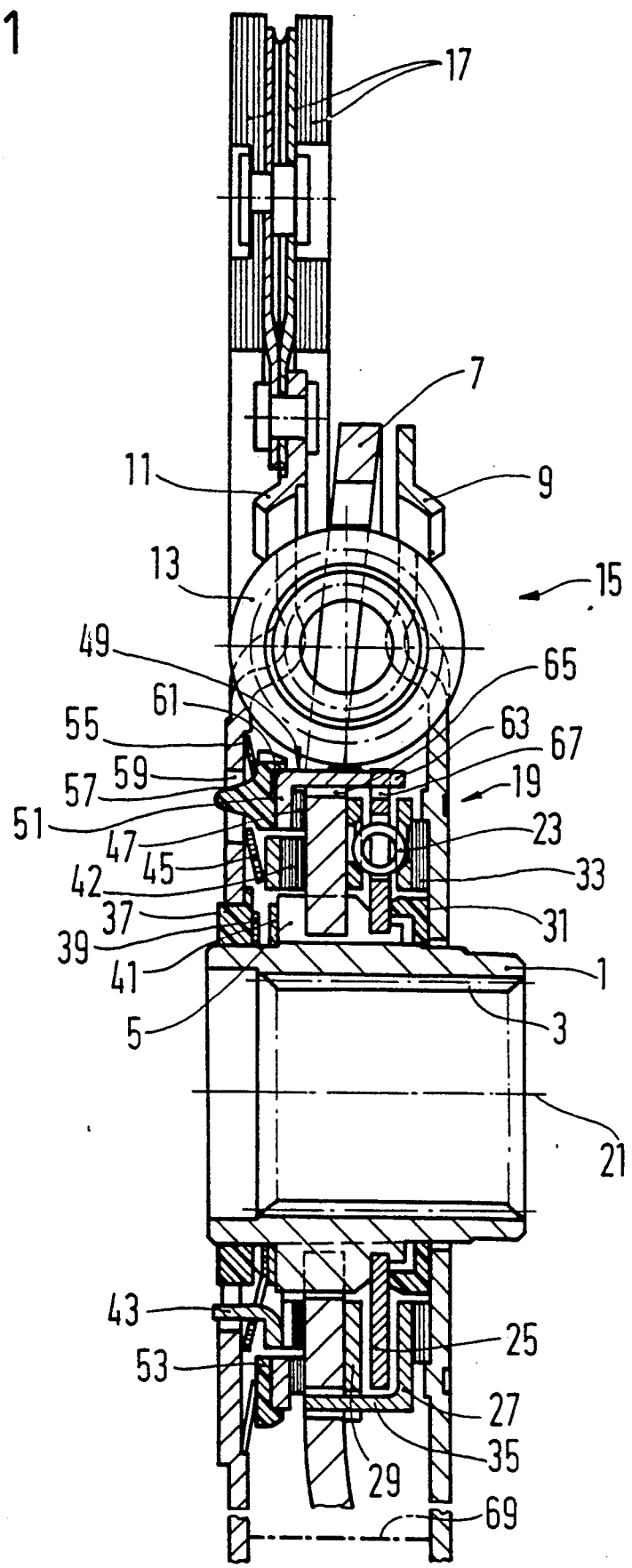
FIG. 1 is a partial axial longitudinal section through a clutch plate for a motor vehicle friction clutch.

FIG. 1 shows a partial longitudinal section through a clutch plate. This comprises a hub 1 which may be placed via internal teeth 3 onto a gear shaft. The hub 1 has radially outwardly directed teeth 5 into which a hub disc 7 engages with play in the peripheral direction according to the range of action of an idling damper. On both sides of the hub disc 7 there are arranged lateral discs or covering plates 9 and 11 which, together with the hub disc 7 and coil springs 13, form a load spring arrangement 15. Friction linings 17 are fastened on the outer periphery of the covering plate 11. The coil springs 13 are inserted into corresponding apertures in the hub disc 7 and the covering plates 9 and 11. An idling spring arrangement 19 as well as components of friction arrangements are arranged in the region radially inside the coil springs 13 between the covering plate 9 and the hub disc 7, and further components of friction arrangements are arranged on the opposite side between the hub disc 7 and the covering plate 11. All components are arranged concentrically round the axis of rotation 21.

The idling spring arrangement 19 comprises a plurality of coil springs 23 with a flat spring characteristic as well as a hub disc 25 placed rigidly onto the hub 1 and two lateral discs or covering plates 27 and 29 which are arranged on either side of the hub disc 25 and are non-rotatably connected to the hub disc 7. The coil springs 23 are arranged in corresponding apertures in the hub disc 25 and the covering plates 27 and 29. In the radially inner region of the hub disc 25 there is arranged a supporting ring 31 which axially fixes all the rotatable components relative to the hub 1 and—as will be described more fully hereinafter—generates basic friction. A friction ring 33 which is part of a load friction arrangement is also arranged between the covering plate 27 of the idling spring arrangement 19 and the covering plate 9. The covering plate 27 has, in the region of its outer periphery, axially angled tabs 35 which produce a non-rotatable connection to the covering plate 29 and to the hub disc 7 in a known manner. These tabs 35 simultaneously rest with peripherally extending edges on the covering plate 29 which, in turn, rests on the hub disc 7. This arrangement ensures the necessary axial space for the idling spring arrangement 19 in particular for the coil springs 23 and the transfer of the contact pressure for the friction ring 33.

Figure 3:
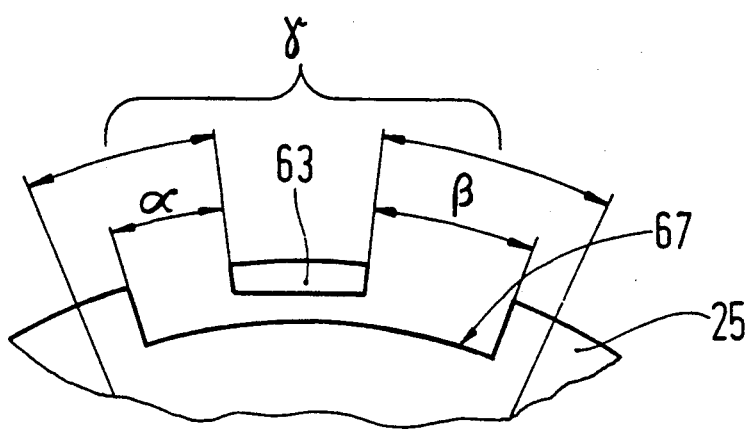
FIG. 3 is a basic diagram for illustrating the operating range of an entrained friction arrangement of the clutch plates.

On the side of the hub disc 7 remote from the idling spring arrangement 19 there is arranged, radially internally between the covering plate 11 and an offset of the hub 1, a bearing 37 which centers all rotatable parts relative to the hub 1. A spring 39 as well as a ring 41 which generate an axial contact pressure between the supporting ring 31 arranged on the other side and the radially inner region of the hub disc 25 is arranged between this bearing 37 and the teeth 5. The low friction created in this way is effective over the entire rotational angle range of the clutch plate. Two friction arrangements are arranged radially on top of one another in the space radially outside the teeth 5 and radially inside the region of the coil springs 13 of the load spring arrangement 15. The friction arrangement closer to the teeth 5 comprises a friction ring 42 which rests on the hub disc 7, a thrust collar 43 which rests on the friction ring 41 as well as a spring 45 which is arranged between the thrust collar 43 and the covering plate 11 and is axially pretensioned. These parts belong together with the friction ring 33 of the friction arrangement for the load range arranged on the opposite side and they act only when the idling range is exceeded and the hub disc 7 has overcome the play in the teeth 5 and is therefore stationary relative to the hub 1. A so-called entrained friction arrangement follows radially outwardly. This comprises a friction ring 47 which rests directly on the hub disc 7, a control plate 49 of which the annular region 51 rests on the friction ring 47 and a thrust collar 53 which rests on the annular region 51 of the control plate 49 and is loaded axially away from the covering plate 11 by a spring 55. The thrust collar 53 is peripherally non-rotatably arranged in openings 59 in the covering plate 11 via noses 57 and is also centered in the radial direction. The thrust collar 53 also centers the control plate 49 by means of a band 61. The control plate 49 has, in the radially outer region of the annular region 51, axially angled tabs 63 which penetrate the hub disc 7 in peripherally enlarged openings 65 and co-operate with the radially outer region of the hub disc 25 of the idling spring arrangement 19. For this purpose, the hub disc 25 has, in the region of its outer periphery, control openings 67 which are designed according to the basic diagram in FIG. 3. The rest position illustrated in FIG. 3 shows one of the tabs 63 of the control plate 49 which has the partial free angle alpha and beta relative to the control opening 67 of the hub disc 25. The entire range of action of the idling spring arrangement 19 is greater than the sum of the two partial free angles alpha and beta in the size of the angle gamma.

The mode of operation of the clutch plate is accordingly as follows: during a peripheral relative movement of the covering plates 9 and 11 with the friction linings 17 in the region of action of the idling spring arrangement 19 according to the angle gamma, the load spring arrangement 15 behaves as a rigid component. Therefore, only the arrangement for the basic friction consisting of components 37, 39, 41, 5, 25, 31, 9 is in action during a movement—starting from a central position according to FIG. 3—in both directions corresponding to the free angles alpha and beta. If the parts 7, 9 and 11 behaving as a rigid unit exceed the free angle alpha or beta, the control plate 49 is forcibly stopped by its tabs 63 striking the end limit of the control openings 67 in the hub disc 25 and cannot continue moving relative to the hub 1 in the same direction of rotation. Further friction which is generated by the relative movement between the hub disc 7 and the covering plate 11 or friction ring 47 and thrust collar 53 relative to the annular region 55 of the control plate 49 therefore occurs in addition to the above-described basic friction. During further relative rotation with respect to the hub 1 and when the angle gamma is exceeded, the hub disc 7 comes to a standstill by striking in the teeth 5 so that the load spring arrangement 15 is stressed from now, i.e. the covering plates 9 and 11 continue rotating relative to the hub disc 7 which is rigid with the hub 1. During this transition, the production of frictional force between the control plate 49 and the hub disc 7 is brought to a standstill so that only the frictional force between the thrust collar 53 and the control plate 49 continues acting and, in addition, the friction arrangement for the load range consisting of the friction rings 34 and 42, the covering plate 9, the thrust collar 43 and the hub disc 7, the contact pressure being produced by the spring 45 and the force being conveyed via the spacer rivets indicated at 69 between the two covering plates 9 and 11 and via an axial support of the tabs 35 of the covering plate 27. During a reversal in the direction of rotation, when the gamma angular region is reached and therefore at the transition of operation from the load spring arrangement 15 into the idling spring arrangement 19, the control plate 49 is entrained by the hub disc 7 owing to the higher friction at the friction ring 47 relative to the hub disc 7 and the tabs 63 cover the sum of the two free angles alpha and beta so that only the low friction of the thrust collar 53 is effective during this course of movement. The total frictional force resulting from the higher frictional force between control plate 49 and hub disc 7 and from the lower frictional force between thrust collar 53 and control plate 49 is only built up again during a relative movement beyond the sum of the two free angles alpha and beta, i.e. therefore after the tabs 63 have struck the ends of the control openings 67.

The described mode of operation of the torsional vibration damper of the clutch plate ensures, on the one hand, that no increased friction is employed during mere idle running, i.e. only the basic friction due to components 37, 39, 41, 5, 25, 31 and 9 is present. When this angle is exceeded, which occurs with greater torque loading or during a change of load from the pulling to the pushing side or vice versa, it is ensured that higher friction is employed before the transition from the flat spring characteristic of the idling spring arrangement 19 to the steep spring characteristic of the load spring arrangement 15, so load changing noises may at least be clearly reduced. Furthermore, the design and arrangement of the individual parts is particularly compact.

Figure 2:
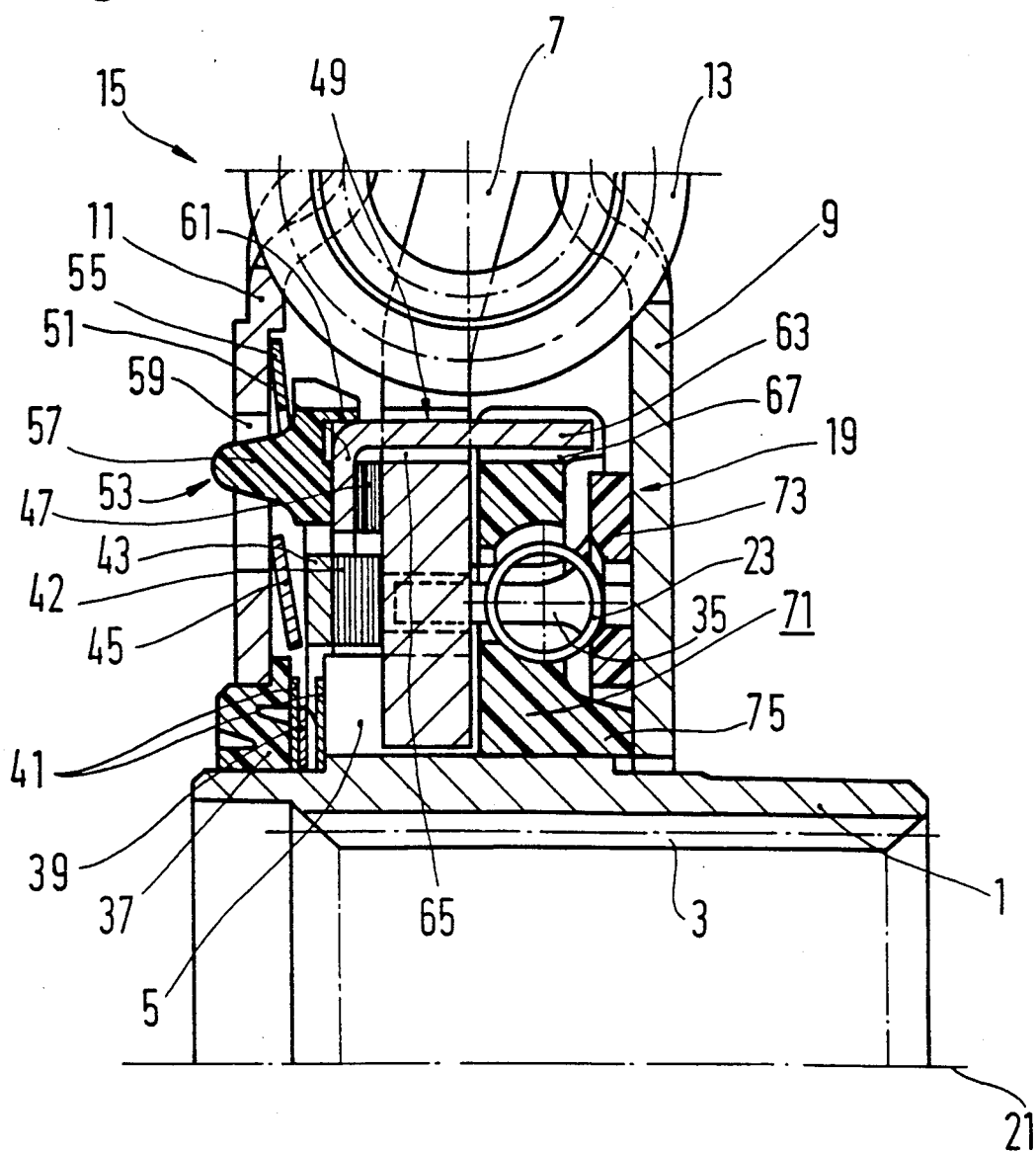
FIG. 2 is a partial axial longitudinal section through a variation of the clutch plate.

The clutch plate shown in magnification in FIG. 2 is a variation of the clutch plate from FIG. 1 and reference will be made to the description of FIG. 1, using identical reference numerals. The idling spring arrangement 19 is merely formed from two plastics parts, namely a hub disc 71 which is non-rotatably arranged on the hub 1 and an input part 73 which assumes the role of the two covering plates 27 and 29 according to FIG. 1. The face of the input part 73 resting on the interior of the covering plate 9 simultaneously forms part of the load friction arrangement, as illustrated in FIG. 1 by the friction ring 33. Furthermore, the hub disc 71 is drawn out axially in the region of its foot 75 so far that it also rests on the covering plate 9 and thus represents part of the basic friction arrangement. The other components correspond to FIG. 1 with regard both to their shape and their operation. The components participating in the production of the basic friction are the bearing 37, two rings 41, the spring 39 between them, the end face of the teeth 5, the radially inner region 75 of the hub disc 71 and the interior of the covering plate 9. The load friction arrangement consists of the spring 45, the thrust collar 43, the friction ring 42, the side of the hub disc 7 facing this friction ring and the contact face between the input part 73 and the internal wall of the covering plate 9. It should be noted that the force of the spring 45 is introduced via radially externally arranged spacer rivets between the covering plates 9 and 11, and the input part 73 corresponding to the covering plate 27 from FIG. 1 is axially supported via tabs 35 relative to the hub disc 7. The entrained friction arrangement consists of the thrust collar 53, the spring 55, the annular region 51 of the control plate 49, the tabs 63 and the control openings 67 in the hub disc 71 (corresponding to the hub disc 25 in FIG. 3). The mode of operation of this entrained friction arrangement has already been described in conjunction with FIGS. 1 and 3. It is pointed out that the frictional force may also be adapted via the size of the friction radii.

While specific embodiments of the invention have been shown and described in detail to illustrate the application of the inventive principles, it will be understood that the invention may be embodied otherwise without departing from such principles.

We claim:

1. Clutch plate for a motor vehicle friction clutch comprising
 a hub (1) which defines an axis of rotation (21),
 a load spring arrangement (15) designed for load running with two lateral discs (9, 11) which are axially spaced from one another, are rigidly connected to one another and are rotatable relative to the hub (1) round the axis of rotation (21), a hub disc (7) which is arranged axially between the lateral discs (9, 11) and is coupled via teeth (5) with a first predetermined rotational play but otherwise non-rotatably to the hub (1) and a plurality of load springs (13) which torsionally elastically couple the lateral discs (9, 11) to the hub disc (7), an idling spring arrangement (19) which is arranged axially between a first (9) of the two lateral discs (9, 11) and the hub disc (7) and is designed for idle running, with an input part (27, 29; 73) non-rotatably connected to the hub disc (7), an output part (25; 71) non-rotatably connected to the hub (1) and at least one idling spring (23) which couples the input part (27, 29; 73) torsionally elastically to the output part (25; 71), wherein the input part (27, 29; 73) is supported on the first lateral disc (9) and carries axial projections (35) which support the input part (27, 29; 73) axially also on the hub disc (7) and connect it without rotational play non-rotatably to the hub disc (7), an idling friction arrangement (31, 39; 39, 75) which is effective at least during idle running, with first friction means (31; 75) pretensioned by a first spring (39), a load friction arrangement (33, 42, 45; 42, 45, 73) which is effective during load running, with second friction means (33) by means of which the input part (27, 29; 73) of the idling spring arrangement (19) is supported on the first lateral disc (9), and with an axially acting second spring (45) which is arranged together with third friction means (42) axially between a second (11) of the two lateral discs (9, 11) and the hub disc (7) radially between the hub (1) and the region of the load springs (13) and axially pretensions the second friction means (33) and third friction means (42), an entrained friction arrangement (47, 49, 53) with a control disc (49) which is rotatable relative to the hub disc (7) and the lateral discs (9, 11) and is coupled via tabs (63) projecting axially from its outer periphery with a second predetermined rotational play smaller than the first predetermined rotational play but otherwise non-rotatably to the output part (25; 71) of the idling spring arrangement (19) and is supported via fourth friction means (53) on one (11) of the two lateral discs (9, 11) and with an axially acting third spring (55) axially pretensioning the fourth friction means (53), the control disc (49) being supported via the fourth friction means (53) on the second lateral disc (11) and via fifth friction means (47) on the hub disc (7), the tabs (63) of the control disc (49) extending through openings (65) in the hub disc (7) to the output part (25; 71) and the fourth friction means (53) and fifth friction means (47) being arranged together with the axially acting third spring (55) radially between the third friction means (42) and the axially acting second spring (45) on the one hand and the region of the load springs (13) on the other hand, and clutch friction linings (17) held on one (11) of the lateral discs (9, 11).

2. Clutch plate according to claim 1, wherein the fifth friction means (47) generate a greater moment of friction than the fourth friction means (53).

3. Clutch plate according to claim 1, wherein the control disc (49) is designed as a sheet metal shaped part and comprises an annular disc region (51) from whose outer periphery the tabs (63) project axially and wherein a friction ring (47) is arranged between the hub disc (7) and the annular disc region (51).

4. Clutch plate according to claim 3, wherein the friction ring (47) consists of organic material.

5. Clutch plate according to claim 3, wherein a thrust collar (53) is arranged axially between the annular disc region (51) of the control disc (49) and the second lateral disc (11), the thrust collar (53) having noses (57) which engage axially into the second lateral disc (11) and fix it axially movably but peripherally as well as radially on the second lateral disc (11) and wherein the axially acting third spring (55) is supported on the second lateral disc (11) on the one hand and the radially outer region of the thrust collar (53) on the other hand.

6. Clutch plate according to claim 5, wherein the thrust collar (53) consists of plastics material.

7. Clutch plate according to claim 5, wherein the thrust collar (53) has an attachment (61) axially covering the outer periphery of the annular disc region (51) of the control disc (49) and radially guiding the control disc (49).

8. Clutch plate for a motor vehicle friction clutch comprising hub (1) which defines an axis of rotation (21), a load spring arrangement (15) designed for load running with two lateral discs (9, 11) which are axially spaced from one another, are rigidly connected to one another and are rotatable relative to the hub (1) round the axis of rotation (21), a hub disc (7) which is arranged axially between the lateral discs (9, 11) and is coupled via teeth (5) with a first predetermined rotational play but otherwise non-rotatably to the hub (1) and a plurality of load springs (13) which torsionally elastically couple the lateral discs (9, 11) to the hub disc (7), an idling spring arrangement (19) which is arranged axially between a first (9) of the two lateral discs (9, 11) and the hub disc (7) and is designed for idle running, with an input part (27, 29; 73) non-rotatably connected to the hub disc (7), an output part (25; 71) non-rotatably connected to the hub (1) and at least one idling spring (23) which couples the input part (27, 29; 73) torsionally elastically to the output part (25; 71), wherein the input part (27, 29; 73) is supported on the first lateral disc (9) and carries axial projections (35) which support the input part (27, 29; 73) axially also on the hub disc (7) and connect it without rotational play non-rotatably to the hub disc (7), an idling friction arrangement (31, 39; 39, 75) which is effective at least during idle running, with first friction means (31; 75) pretensioned by a first spring (39), a load friction arrangement (33, 42, 45; 42, 45, 73) which is effective during load running, with second friction means (33) by means of which the input part (27, 29; 73) of the idling spring arrangement (19) is supported on the first lateral disc (9), and with an axially acting second spring (45) which is arranged together with third friction means (42) axially between a second (11) of the two lateral discs (9, 11) and the hub disc (7) radially between the hub (1) and the region of the load springs (13) and axially pretensions the second friction means (33) and third friction means (42), an entrained friction arrangement (47, 49, 53) with a control disc (49) which is rotatable relative to the hub disc (7) and the lateral discs (9, 11) and is coupled via tabs (63) projecting axially from its outer periphery with a second predetermined rotational play smaller than the first predetermined rotational play but otherwise non-rotatably to the output part (25; 71) of the idling spring arrangement (19) and is supported via fourth friction means (53) on one (11) of the two lateral discs (9, 11) and with an axially acting third spring (55) axially pretensioning the fourth friction means (53), the control disc (49) being supported via fifth friction means (47) on the hub disc (7) or a component (27) non-rotatably connected to the hub disc (7) and the fifth friction means (47) generating a greater moment of friction than the fourth friction means (53), and clutch friction linings (17) held on one (11) of the lateral discs (9, 11).

9. Clutch plate according to claim 8, wherein the control disc (49) is designed as a sheet metal shaped part and comprises an annular disc region (51) from whose outer periphery the tabs (63) project axially and wherein a friction ring (47) is arranged between the hub disc (7) and the annular disc region (51).

10. Clutch plate according to claim 9, wherein the friction ring (47) consists of organic material.

11. Clutch plate according to claim 9, wherein a thrust collar (53) is arranged axially between the annular disc region (51) of the control disc (49) and the second lateral disc (11), the thrust collar (53) having noses (57) which engage axially into the second lateral disc (11) and fix it axially movably but peripherally as well as radially on the second lateral disc (11) and wherein the axially acting third spring (55) is supported on the second lateral disc (11) on the one hand and the radially outer region of the thrust collar (53) on the other hand.

12. Clutch plate according to claim 11, wherein the thrust collar (53) consists of plastics material.

13. Clutch plate according to claim 11, wherein the thrust collar (53) has an attachment (61) axially covering the outer periphery of the annular disc region (51) of the control disc (49) and radially guiding the control disc (49).

* * * * *